(12) United States Patent
Salihbegovic et al.

(10) Patent No.: US 10,161,232 B2
(45) Date of Patent: Dec. 25, 2018

(54) LIFT VALVE WITH BELLOW HYDRAULIC PROTECTION AND CHATTER REDUCTION

(71) Applicant: Weatherford Technology Holdings, LLC, Houston, TX (US)

(72) Inventors: Zlatko Salihbegovic, New Iberia, LA (US); Aaron Michael Henry Ranson, Lafayette, LA (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 316 days.

(21) Appl. No.: 14/947,932

(22) Filed: Nov. 20, 2015

(65) Prior Publication Data

US 2016/0145983 A1    May 26, 2016

Related U.S. Application Data

(60) Provisional application No. 62/084,676, filed on Nov. 26, 2014.

(51) Int. Cl.
| | | |
|---|---|---|
| *E21B 43/12* | (2006.01) | |
| *F16K 31/126* | (2006.01) | |
| *F16K 39/02* | (2006.01) | |
| *E21B 34/10* | (2006.01) | |

(52) U.S. Cl.
CPC .......... *E21B 43/123* (2013.01); *F16K 31/126* (2013.01); *F16K 39/02* (2013.01); *E21B 34/10* (2013.01); *Y10T 137/7836* (2015.04)

(58) Field of Classification Search
CPC ...... E21B 43/123; E21B 34/10; F16K 31/126; F16K 39/02; Y10T 137/7836
USPC ....................................................... 92/181 P
See application file for complete search history.

(56) References Cited

U.S. PATENT DOCUMENTS

| | | | | | |
|---|---|---|---|---|---|
| 1,701,072 | A | * | 2/1929 | Hapgood ................. | A01J 5/08 119/14.49 |
| 2,462,580 | A | * | 2/1949 | Watson ..................... | F15B 9/08 60/581 |
| 2,668,553 | A | * | 2/1954 | Howard ................. | E21B 43/123 137/155 |
| 2,761,465 | A | * | 9/1956 | Garrett .................. | E21B 43/123 137/155 |
| 2,797,700 | A | * | 7/1957 | McGowen, Jr. ...... | E21B 43/123 137/155 |
| RE25,292 | E | * | 12/1962 | Dudley ................. | E21B 43/123 137/155 |
| 3,530,770 | A | * | 9/1970 | Abercrombie ........... | F16J 3/048 137/155 |
| 3,789,874 | A | * | 2/1974 | Hills ........................ | F16K 1/24 137/527 |

(Continued)

OTHER PUBLICATIONS

EPO Extended European Search Report dated Apr. 18, 2016, for EPO Patent Application No. 15195796.6.

*Primary Examiner* — William McCalister
(74) *Attorney, Agent, or Firm* — Patterson & Sheridan LLP

(57) ABSTRACT

Embodiments of the present disclosure generally relate gas lift valves for use in hydrocarbon wells for artificial lift operations. One embodiment of the present disclosure is a valve. The valve comprises a housing and a bellows disposed in the housing. A first side of the bellows is in fluid communication with an inlet of the housing, and a second side of the bellows faces a closed chamber in the housing. The valve further comprises a barrier assembly disposed in the closed chamber.

15 Claims, 12 Drawing Sheets

(56) References Cited

U.S. PATENT DOCUMENTS

| | | | |
|---|---|---|---|
| 3,993,129 A | 11/1976 | Watkins | |
| 4,023,363 A * | 5/1977 | Liebert | B62D 5/061 60/385 |
| 4,509,409 A * | 4/1985 | Reeves | B66F 3/26 92/181 P |
| 4,729,283 A * | 3/1988 | Hillier | F15B 15/1447 137/614.11 |
| 4,825,752 A * | 5/1989 | Kiffmeyer | F15B 15/225 91/419 |
| 5,421,241 A * | 6/1995 | Terral | E21B 43/123 92/34 |
| 5,425,305 A * | 6/1995 | Mauritz | F15B 15/204 251/325 |
| 5,465,747 A * | 11/1995 | de Almeida | E21B 43/123 137/155 |
| 6,170,383 B1 * | 1/2001 | Mauritz | F15B 15/1447 91/399 |
| 6,176,170 B1 * | 1/2001 | Uppgard | F15B 15/1476 440/61 G |
| 6,398,527 B1 * | 6/2002 | Gram | F03C 1/0076 417/398 |
| 6,932,581 B2 * | 8/2005 | Messick | E21B 43/123 137/155 |
| 7,228,909 B2 * | 6/2007 | Schmidt | E21B 43/122 166/117.5 |
| 7,373,972 B2 * | 5/2008 | Ocalan | F16K 31/426 166/332.1 |
| 8,683,910 B1 * | 4/2014 | Foster | F01L 11/06 91/229 |
| 2002/0139534 A1 | 10/2002 | Holt | |
| 2004/0182437 A1 | 9/2004 | Messick | |
| 2007/0227739 A1 * | 10/2007 | Becker | E21B 43/123 166/319 |
| 2009/0044947 A1 * | 2/2009 | White | E21B 43/123 166/321 |
| 2010/0096142 A1 * | 4/2010 | Randazzo | E21B 43/123 166/373 |
| 2010/0155079 A1 * | 6/2010 | Stokka | E21B 43/123 166/373 |
| 2011/0067879 A1 * | 3/2011 | Kleppa | E21B 34/08 166/326 |
| 2011/0127043 A1 * | 6/2011 | Hahn | E21B 43/123 166/373 |
| 2013/0032226 A1 | 2/2013 | Salihbegovic | |
| 2014/0069659 A1 | 3/2014 | Wang et al. | |
| 2014/0182437 A1 * | 7/2014 | Lin | B21D 28/14 83/451 |
| 2014/0182855 A1 | 7/2014 | Woodford | |
| 2016/0145983 A1 * | 5/2016 | Salihbegovic | E21B 43/123 137/12 |

* cited by examiner

LIFT VALVE WITH BELLOW HYDRAULIC PROTECTION AND CHATTER REDUCTION

CLAIM OF PRIORITY UNDER 35 U.S.C. 119

This application claims benefit of U.S. Provisional Patent Application No. 62/084,676, filed Nov. 26, 2014 and entitled "Lift Valve with Bellow Hydraulic Protection and Chatter Reduction," which is herein incorporated by reference in its entirety.

BACKGROUND

Field

Embodiments of the present disclosure generally relate to valves capable of withstanding high pressures, including valves for use in hydrocarbon wells for artificial lift operations.

Description of the Related Art

To obtain hydrocarbon fluids from an earth formation, a wellbore is drilled into the earth to intersect an area of interest within a formation. The wellbore may then be "completed" by inserting casing within the wellbore and setting the casing therein using cement, for example. In the alternative, the wellbore may remain uncased (an "open hole" wellbore), or may be only partially cased. Regardless of the form of the wellbore, production tubing is typically run into the wellbore primarily to convey production fluid (e.g., hydrocarbon fluid, as well as water and other, non-hydrocarbon gases) from the area of interest within the wellbore to the surface of the wellbore.

Often, pressure within the wellbore is insufficient to cause the production fluid to rise naturally through the production tubing to the surface of the wellbore. Thus, to force the production fluid from the area of interest within the wellbore to the surface, artificial lift means are sometimes employed. Gas lift is an example of artificial lift means for increasing production of oil and gas from a wellbore.

Gas lift systems are often the preferred artificial lifting systems because operation of gas lift systems involves fewer moving parts than operation of other types of artificial lift systems, such as sucker rod lift systems. Moreover, because no sucker rod is required to operate the gas lift system, gas lift systems are usable in offshore wells having subsurface safety valves that would interfere with a sucker rod.

Gas lift systems commonly incorporate one or more valves in side pocket mandrels of the production tubing to enable the lifting of production fluid to the surface. Ideally, the gas lift valves allow gas from the annulus between the casing and production tubing to enter the tubing through the valves, but prevent reverse flow of production fluid from the tubing to the annulus.

One type of gas lift valves are injection pressure operated gas lift valves which generally include a bellows to convert pressure from the injection gas into movement. However, the pressure in the injection gas is much higher than working pressure of the bellows. To protect the bellow, entrapment of a liquid on one side of the bellows is usually used to act against the injection gas pressure from an opposite side of the bellows. However, gas bubbles are sometimes trapped in the liquid during operation and damage the bellows. Traditionally, a high viscosity liquid is generally used in the injection pressure operated gas lift valves to dampen valve chatter. However, because gas lift valves usually operates a high temperature of up to 300° F., viscosity of the liquid reduces significantly leaving valve chattering untamed.

Therefore, there is a need for apparatus and methods to provide bellow protection and to reduce chattering in lift valves.

SUMMARY

Embodiments of the present disclosure generally relate lift valves for use in hydrocarbon wells for artificial lift operations.

One embodiment of the present disclosure is a valve. The valve comprises a housing and a bellows disposed in the housing. A first side of the bellows is in fluid communication with an inlet of the housing, and a second side of the bellows faces a closed chamber in the housing. The valve further comprises a barrier assembly disposed in the closed chamber.

Another embodiment of the present disclosure provides a gas lift valve. The gas lift valve comprises one or more components forming a housing, wherein the housing has a gas injection port and an outlet port, a valve mechanism disposed in the housing, wherein the valve mechanism selectively opens and closes a flow path between the gas injection port and the outlet port, and a bellows coupled to the valve mechanism, wherein a first side of the bellows is in fluid communication with the gas injection port, and a second side of the bellows is in fluid communication with a pressure charge chamber formed in the housing. The valve further comprises a barrier assembly movably disposed in the pressure charge chamber, wherein the barrier assembly divides the pressure charge chamber to a liquid volume and a gas volume, and the liquid volume is positioned between the gas volume and the second side of the bellows.

Another embodiment of the present disclosure is a barrier assembly. The barrier assembly comprises a piston body, wherein a flow path is formed through the piston body, a first end of the flow path faces a first side of the piston body, and a second end of the flow path faces a second side of the piston body, and a two way check valve disposed in the flow path.

Another embodiment provides a method of operating a gas lift valve. The method includes supplying a gas into the gas lift valve, expanding a bellows of the gas lift valve against a non-compressible fluid, moving a barrier assembly disposed between a non-compressible liquid and a gas volume to reduce a size of the gas volume, and opening an outlet port to eject the gas in the gas lift valve.

BRIEF DESCRIPTION OF THE DRAWINGS

So that the manner in which the above recited features of the present disclosure can be understood in detail, a more particular description of the various aspects, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
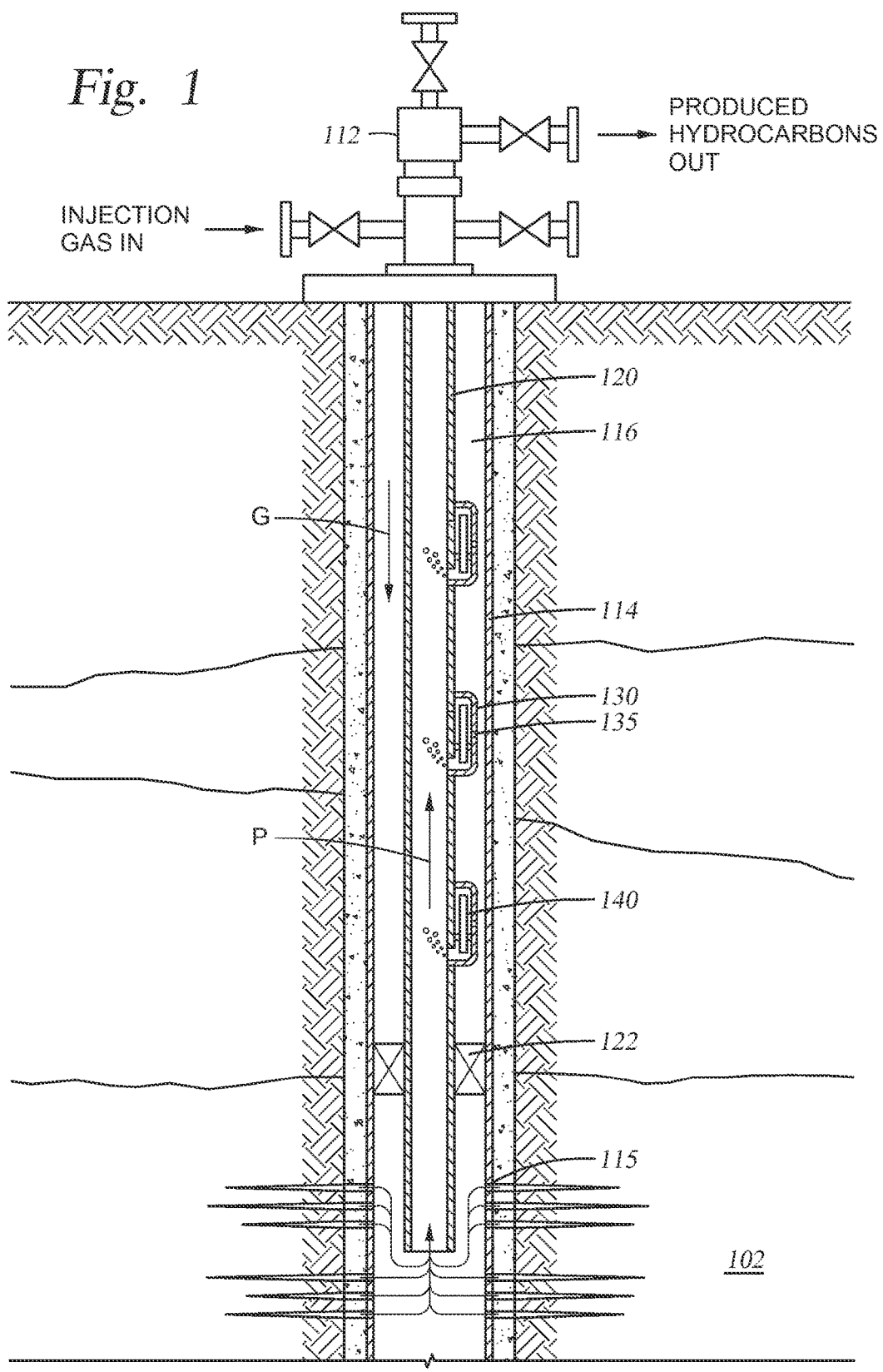
FIG. 1 schematically illustrates a typical gas lift completion for hydrocarbon recovery.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present disclosure. However, it will be apparent to one of skill in the art that the present disclosure may be practiced without one or more of these specific details. In other instances, well-known features have not been described in order to avoid obscuring the present disclosure.

Embodiments of the present disclosure provide an injection pressure operated lift valve having a barrier in a pressure charge chamber to separate bellow protecting liquid and pressurized gas. In one embodiment, the bellow protecting liquid may be silicone oil. The pressurized gas may be pressurized nitrogen. Without the barrier, nitrogen may penetrate and saturate silicone oil causing the silicone oil to become compressible and ineffective in protecting the bellows. The barrier separates the pressurized gas, such as nitrogen, from the bellow protecting liquid, such as silicon oil, to prevent the pressurized gas from penetrating the bellow protecting liquid. The barrier ensures the bellow protecting liquid to remain non-compressible, therefore, allows the lift valves to operate at a higher pressure and to have a higher number of open/close cycles. The barrier also eliminates the necessity of maintaining lift valves at an upright position, thus, providing convenience in transportation and installation. Furthermore, because the barrier moves with the bellows, the drag friction of the barrier provides restriction to movements of the gas lift valve, which reduces undesired chatter.

FIG. 1 illustrates a typical gas lift completion for hydrocarbon recovery, which may include a wellhead 112 atop a casing 114 that passes through a formation 102. Production tubing 120 positioned in the casing 114 may have a number of side pocket mandrels 130 and a production packer 122. To conduct a gas lift operation, operators conventionally install gas lift valves 140 in the side pocket mandrels 130.

With the gas lift valves 140 installed, compressed gas G from the wellhead 112 may be injected into the annulus 116 between the production tubing 120 and the casing 114. In the side pocket mandrels 130, the gas lift valves 140 then act as one-way valves by opening in the presence of high-pressure injection gas, thereby allowing the gas to flow from the annulus 116 to the production tubing 120.

Downhole, the production packer 122 forces upwards travel through the production tubing 120 of production fluid P entering casing perforations 115 from the formation 102. Additionally, the production packer 122 keeps the gas flow in the annulus 116 from entering the production tubing 120.

The injected gas G passes down the annulus 116 until it reaches the side pocket mandrels 130. Entering the mandrel's inlet ports 135, the gas G first passes through the gas lift valve 140 before it can pass into the production tubing 120. Once in the production tubing 120, the gas G can then rise to the surface, lifting production fluid P in the production tubing in the process.

When pressure is reduced as a result of discontinued pumping of gas at the surface, the gas lift valve 140 closes to prevent reverse production fluid flow from the production tubing 120 to the annulus 116.

Figure 2A:
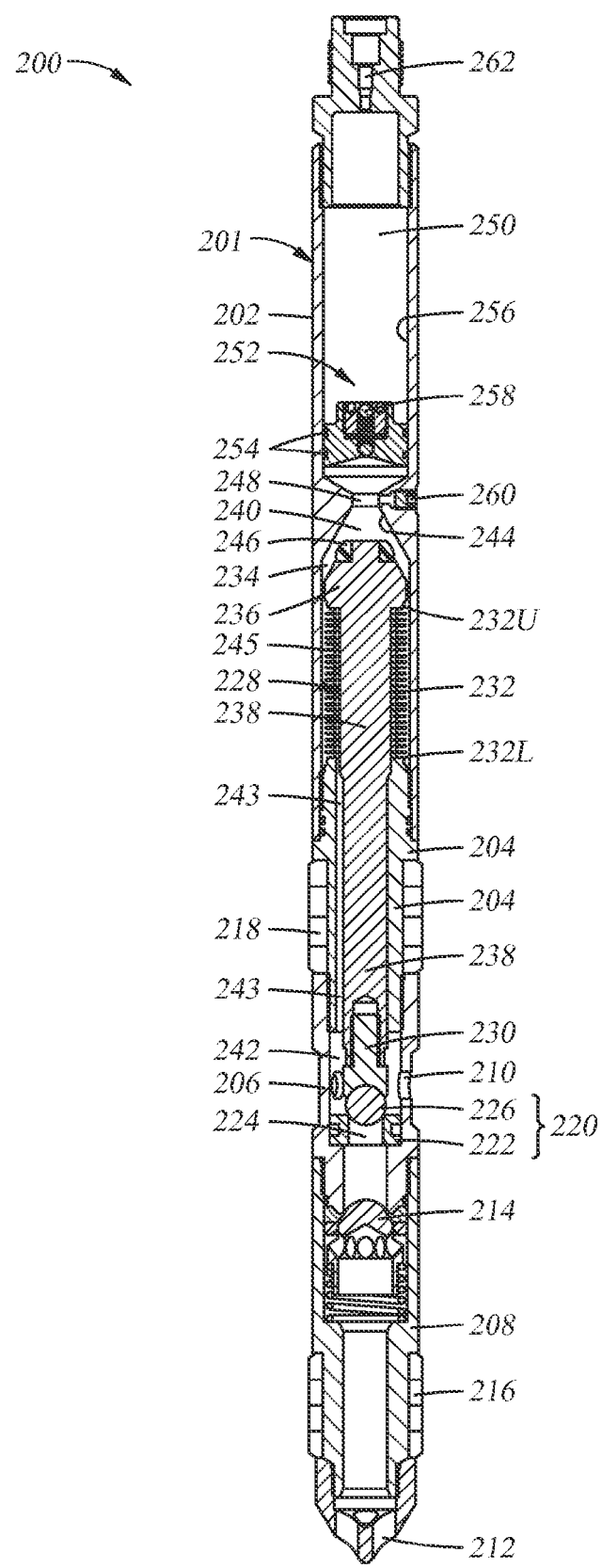
FIG. 2A is a schematic sectional view of a gas lift valve with a formed-convoluted-formed bellows according to one embodiment of the present disclosure.

FIG. 2A is a schematic sectional view of a gas lift valve 200 according to one embodiment of the present disclosure. The gas lift valve 200 may be used in the gas lift completion of FIG. 1 instead of the gas lift valve 140. The gas lift valve 200 includes a housing 201. The housing 201 may be formed from one or more components. As shown in FIG. 2A, the housing 201 is formed by housing components 202, 204, 206, 208. The housing 201 may include a gas injection port 210 and an outlet port 212. Packers 216, 218 are positioned on both sides of the gas injection port 210 to isolate the gas inject port 210.

A one way valve 214 may be disposed in the housing 201 between the gas injection port 210 and the outlet port 212. The one way valve 214 allows fluid flow from the gas injection port 210 to the outlet port 212, but does not allow flow in the opposite direction. In one embodiment, the one way valve 214 may be a check valve.

A valve mechanism 220 may be disposed in the housing 201. The valve mechanism 220 is positioned to selectively open and close a flow path between the gas injection port 210 and the outlet port 212. The valve mechanism 220 may be any suitable mechanism. In the embodiment of FIG. 2A, the valve mechanism 220 is a ball and seat mechanism. The valve mechanism 220 includes a seating element 222 and a ball 226. The seating element 222 may define an orifice 224, and the ball 226 may be formed from tungsten carbide. When the ball 226 contacts the seating element 222, the ball 226 blocks the orifice 224, thereby closing the gas lift valve 200. When the ball 226 moves away from the seating element 222, the orifice 224 is opened, thereby opening the gas lift valve 200.

The ball 226 may be driven by a bellows 232 disposed in the housing 201. The bellows 232 functions as a membrane-seal dividing the housing 201 into an injection volume 242 and a pressure charge chamber 240. The injection volume 242 is in fluid communication with the gas injection port 210. The pressure charge chamber 240 and the injection volume 242 are on opposite sides of the bellows 232. In the embodiment of FIG. 2A, the injection volume 242 includes an inner volume 245 of the bellows 232 while the pressure charge chamber 240 is exterior to the bellows 232. Alternatively, the injection volume 242 is exterior to the bellows 232 while the pressure charge chamber 240 is interior to the bellows 232.

Embodiments of the present disclosure include a barrier assembly 252 movably disposed in the pressure charge chamber 240. The barrier assembly 252 divides the pressure charge chamber 240 into a liquid volume 234 and a gas volume 250. The liquid volume 234 may be filled with a non-compressible liquid, and the gas volume 250 may be filled with a pressurized gas. The liquid volume 234 is disposed between the bellows 232 and the barrier assembly 252. Because the barrier assembly 252 prevents gas in the gas volume 250 from entering the liquid volume 234, the bellows 232 only contacts the non-compressible liquid in the liquid volume 234. The compressed gas in the gas volume 250 interacts with the injection gas in the injection volume 242 through the non-compressible liquid in the liquid volume 234 and the barrier assembly resulting in extension and compression of the bellows 232.

In the embodiment of FIG. 2A, a lower end 232L of the bellows 232 may be fixedly coupled to the housing 201. An upper end 232U of the bellows 232 may be coupled to a sliding stem 228. The sliding stem 228 may include a head portion 236 and a stem portion 238. The head portion 236 is disposed in the liquid volume 234 above the upper end 232U of the bellows 232. One end of the stem portion 238 is coupled to the head portion 236 and the other end is coupled to the ball 226. The stem portion 238 extends from the head portion 236 through the inner volume 245 of the bellows 232. An adaptor 230 may be used to connect the ball 226 to the sliding stem 228. The extension of the bellows 232 moves the sliding stem 228 up within the housing 201, thereby moving the ball 226 away from the seating element 222 to open the gas lift valve 200. The compression of the bellows 232 moves the sliding stem 228 down within the housing 201, thereby moving the ball 226 toward the seating element 222 to close the gas lift valve 200.

The bellows 232 may be any suitable bellows, such as a convoluted-formed bellows or an edge welded bellows. FIG. 2A illustrates the bellows 232 as a convoluted-formed bellows.

Figure 2B:
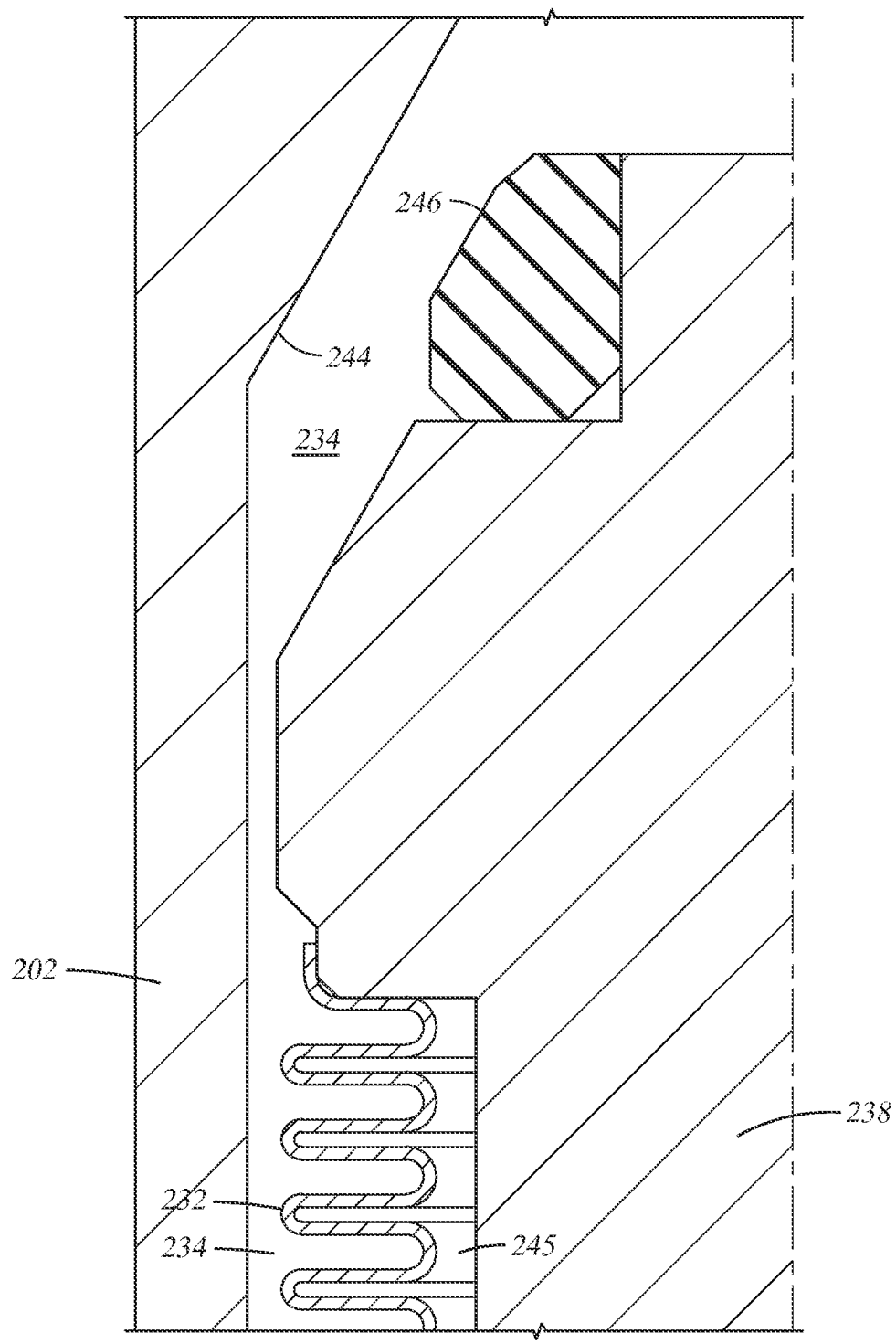
FIGS. 2B-2C are partial enlarged sectional views of the gas lift valve of FIG. 2A.

In one embodiment, the liquid volume 234 may have a cone shaped shoulder 244 and an orifice 248 formed above the cone shaped shoulder 244. A seal member 246 may be disposed on the head portion 236 for engagement with the cone shaped shoulder 244. When the sliding stem 228 moves up, the seal member 246 may contact the cone shaped shoulder 244 to stop the sliding stem 228. In one embodiment, the seal member 246 is formed from a soft metal, such as copper. FIG. 2B is a partial enlarged view of the gas lift valve 200 showing the seal member 246 and the cone shaped shoulder 244.

Figure 2C:
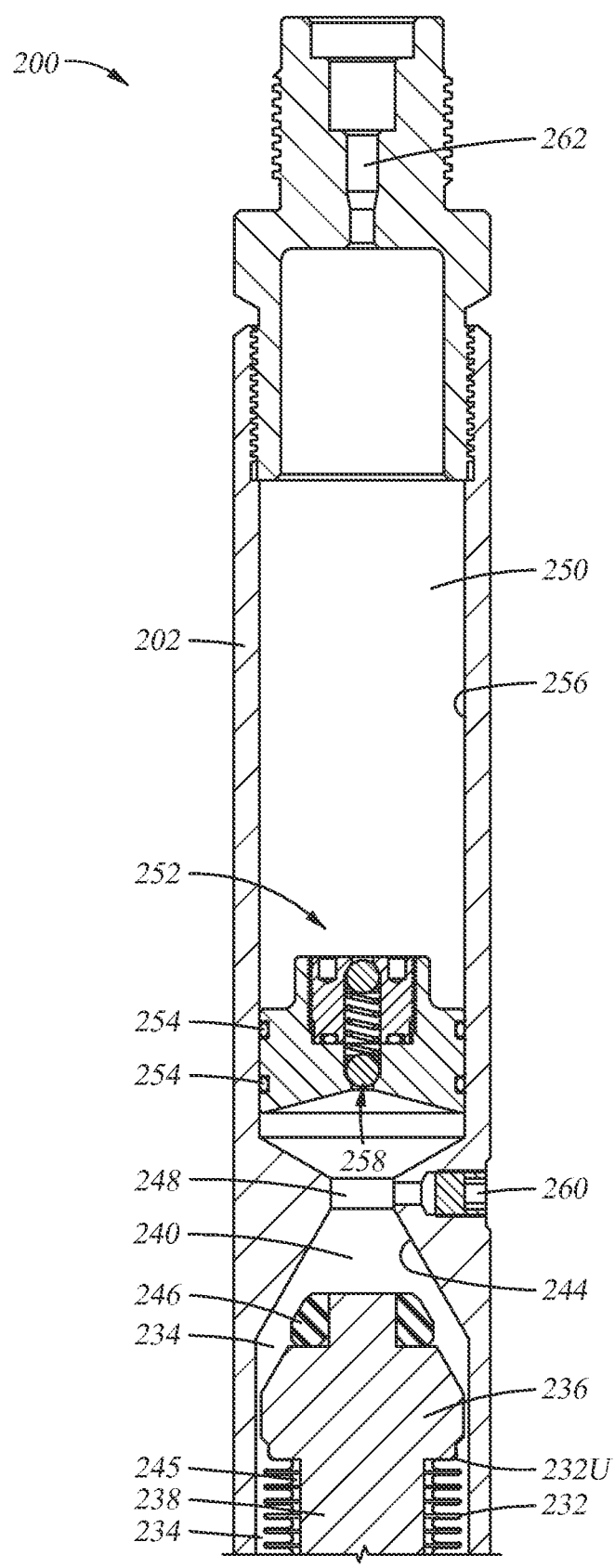

FIG. 2C is a partial enlarged sectional view of the gas lift valve 200 showing the gas volume 250. The gas volume 250 may be defined by the housing 201 and the barrier assembly 252. The barrier assembly 252 may be disposed above the orifice 248 and across an inner diameter of the housing 201. In one embodiment, the barrier assembly 252 is a piston movably disposed against the inner wall 256 of the housing 201. One or more seal rings 254 may be disposed between the barrier assembly 252 and the housing 201 to fluidly separate the gas volume 250 and the liquid volume 234. Optionally, a two way check valve 258 may be disposed in the barrier assembly 252. The two way check valve 258 is designed to allow a fluid flow between two sides of the barrier assembly 252 when use a special tool (to be discussed with FIG. 3).

In one embodiment, an optional liquid charge valve 260 may be disposed near the orifice 248. The charge valve 260 may be used to charge the liquid volume 234 with a non-compressible fluid. In one example, the liquid volume 234 is filled with a high viscosity liquid, such as silicone oil.

The gas lift valve 200 may include a gas charge valve 262 configured to charge a compressible gas in the gas volume 250. The gas charge valve 262 may be core valve. In one example, pressurized nitrogen is supplied into the gas volume 250 above the barrier assembly 252.

Figure 3:
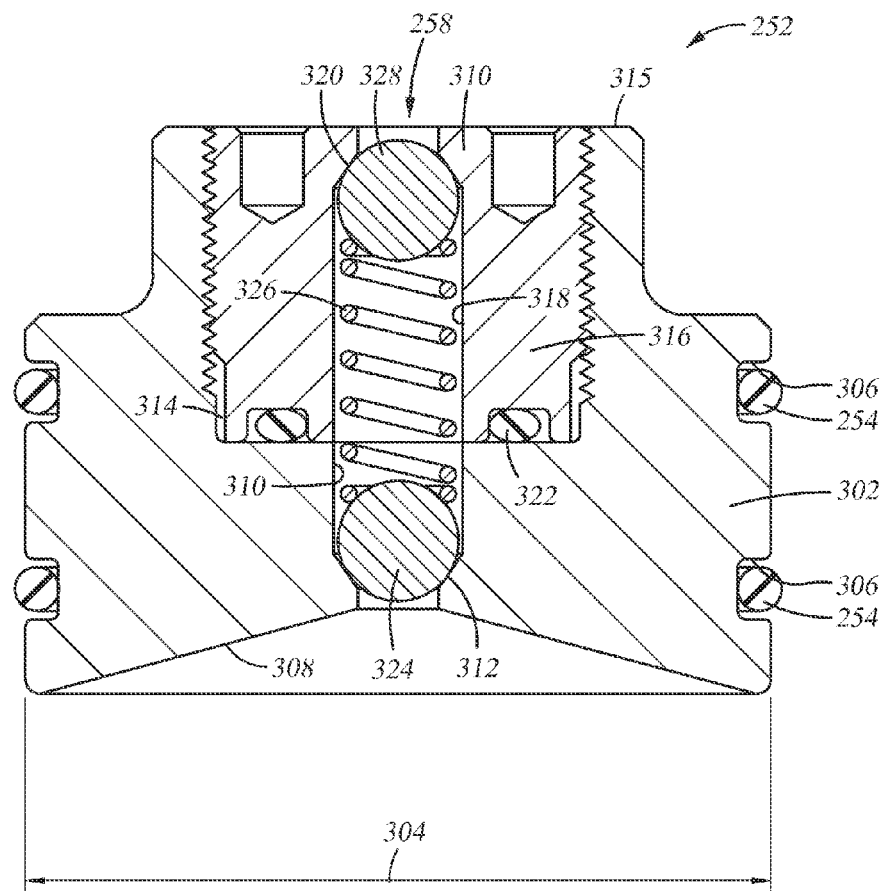
FIG. 3 is a schematic sectional view of a barrier according to one embodiment of the present disclosure.

FIG. 3 is a schematic sectional view of the barrier assembly 252 according to one embodiment of the present disclosure. The barrier assembly 252 may include a piston body 302. An outer diameter 304 of the piston body 302 may be sized to sealingly engage the housing 201 and slide within a gas lift valve, such as the gas lift valve 200. One or more grooves 306 may be formed on the outer diameter 304 of the piston body 302 to receive the one or more seal rings 254. The one or more seal rings 254 sealingly engage the inner wall 256 to fluidly separate opposite sides of the barrier assembly 252.

The piston body 302 may have a central bore 310 extending therethrough. In one embodiment, a first end 308 of the piston body 302 may have a conical shape. In operation, the first end 308 may face a liquid volume. The conical shape of the first end 308 allows any gas bubbles in the liquid volume to rise along the conical surface to the central bore 310. A second end 315 of the piston body 302 faces the gas volume 250. A first sealing faces 312 may be formed in the central bore 310 near the first end 308 of the piston body 302. A second sealing face 320 may be formed in the central bore 310 opposite the first sealing face 312.

A first ball 324 may be disposed in the central bore 310 near the sealing face 312. A second ball 328 may be disposed in the central bore 318 near the second sealing face 320. A bias member 326 may be disposed between the balls 324, 328. The bias member 326 may be a compressed spring configured to bias the balls 324, 328 towards their respective sealing faces 312, 320 to form seals therebetween. The balls 324, 328 and the bias member 326 form a two way check valve preventing fluid flow through the central bores 310, 318 regardless of pressure levels on either side of the barrier assembly 252.

In one embodiment, a threaded hole 314 may be formed in the second end surface 315 of the piston body 302 for receiving an insert 316. A portion of the central bore 318 may be formed in the insert 316; which, when secured in the threaded hole 314, completes the central bore 318 of the piston body 302. In one embodiment, a seal ring 322 may be used to fluidly seal the interface between the piston body 302 and the insert 316.

Referring back to FIGS. 2A-2B, the barrier assembly 252 is disposed in the pressure charge chamber 240 defined by the housing 201. The barrier assembly 252 divides the pressure charge chamber 240 into the liquid volume 234 and the gas volume 250. During operation, a pressurized gas, such as pressurized nitrogen, is supplied into the gas volume 250. A non-compressible liquid, such as silicone oil, is supplied into the liquid volume 234 below the barrier assembly 252 so that the exterior of the bellows 232 is filled with the non-compressible liquid. The inner volume 245 of the bellows 232 is in fluid communication with the injection volume 242 through a gap 243 between the sliding stem 228 and the housing 201.

When there is no injection gas supplied or the pressure of the injection gas is lower than a predetermined opening pressure, the gas lift valve 200 is in a closed position with the ball 226 contacting the seating element 222, as shown in FIG. 2A. An injection gas may enter the gas injection port 210 to the injection volume 242, and then to the inner volume 245 of the bellows 232 through the gap 243. The injection gas increases the pressure in the inner volume 245 to cause expansion of the bellows 232. In turn, the sliding stem 288 moves upward to lift the ball 226 away from the seating element 222. When the ball 226 moves away from the seating element, the orifice 224 opens to allow the injection gas to flow through the outlet port 212.

Upon expansion of the bellows 232, the head portion 236 of the sliding stem 228 moves upwards in the liquid volume 234 to displace some of the non-compressible liquid in the liquid volume 234 through the orifice 248. The displaced non-compressible liquid urges the barrier assembly 252 upwards in the housing 201, thereby compressing the pressurized gas in the gas volume 250. The pressure of the pressurized gas increases while size of the gas volume 250 reduces. The barrier assembly 252 transfers the pressure of the pressurized gas to the non-compressible liquid in the liquid volume 234 and then to the bellows 232. The exterior of the bellows 232 is subject to the pressure of the pressurized gas in the gas volume 250 while the inner volume 245 of the bellows 232 is subject to the pressure of the injection gas. The bellows 232 stops moving when the pressure of the injection gas in the inner volume 245 balances with the pressure of the pressurized gas in the gas volume 250.

In the event that the pressure of the injection gas is very high, the sliding stem 228 may move up in the liquid volume 234 such that that the seal member 246 contacts the cone shaped shoulder 244. The seal member 246 and the cone shaped shoulder 244 then provide an upper limit to the movement of the bellows 232. The upper limit provides protection to the bellows 232 against injection gas at high pressures because the liquid in the liquid volume 234 remains non compressible and supports walls of the bellows 232 to prevent the bellows 232 from deformation and damage by the high pressures of the injection gas.

When the pressure of the injection gas reduces, the pressurized gas in the gas volume 250 expands to push the sliding stem 228 downward. The sliding stem 228 may move the ball 226 into contact with the seating element 222, thereby closing the orifice 224. The ball 226 and the seating element 222 also serve as a lower limit for the movement of the bellows 232.

When the barrier assembly 252 is not used, lab experiments have demonstrated that the pressurized gas actually "bleeds" into the non-compressible liquid to form fluid mixture that is compressible. This compressible mixture of gas and liquid may prevent gas lift valves from working properly under high pressure because the protection provided by the non-compressible fluid is adversely affected. Embodiments of the barrier assembly 252 provide a physical barrier between the pressurized gas in the gas volume 250 and the non-compressible liquid in the liquid volume 234. Because the barrier assembly 252 prevents the pressurized gas from bleeding into the non-compressible liquid during operation, the bellows 232 is protected by the non-compressible liquid all the time. Gas lift valves according to the present disclosure may work under higher pressure than traditional gas lift valves. Conventional lift valve without any barriers between the liquid and the gas in a pressure charge chamber have an upper pressure limit of about 3500 PSI in the pressure charge chamber. Lift valves of the present disclosure may operate at a pressure of about 5000 PSI in the pressure charge chamber 240 with an injection gas pressure of about 5500 PSI.

The barrier assembly 252 may also function as a dampener to the bellows 232, thereby reducing chatter of the gas lift valve 200. Traditional gas lift valves rely on the viscosity of the non-compressible liquid to dampen the bellows. However, because gas lift valves usually work at a temperature up to 300° F. where viscosity of the non-compressive liquid reduces significantly, the non-compressive liquid becomes less ineffective at dampening during operation. As a result, the traditional gas lift valves chatters with small changes in the pressure of the injection gas. In contrast, embodiments of the barrier assembly 252 in the gas lift valve 200 moves with the bellows 232 because the non-compressive nature of the liquid between the bellows 232 and the barrier assembly 252. The seal rings 254 of the barrier assembly 252 contact the housing 201 generating drag-friction when the barrier assembly 252 moves relative to the housing. The drag-friction provides restriction to the movement of the bellows 232 thus reducing chatter.

The barrier assembly 252 also makes it convenient to transport and install the gas lift valve 200. Traditionally, gas lift valves are kept in a vertical position to prevent any gas entering the liquid volume outside the bellows. Maintaining the gas lift valves in the vertical position is not always convenient. With the barrier assembly 252 disposed between the gas and liquid, there is no need to maintain a vertical position during transportation or installation.

Figure 4:
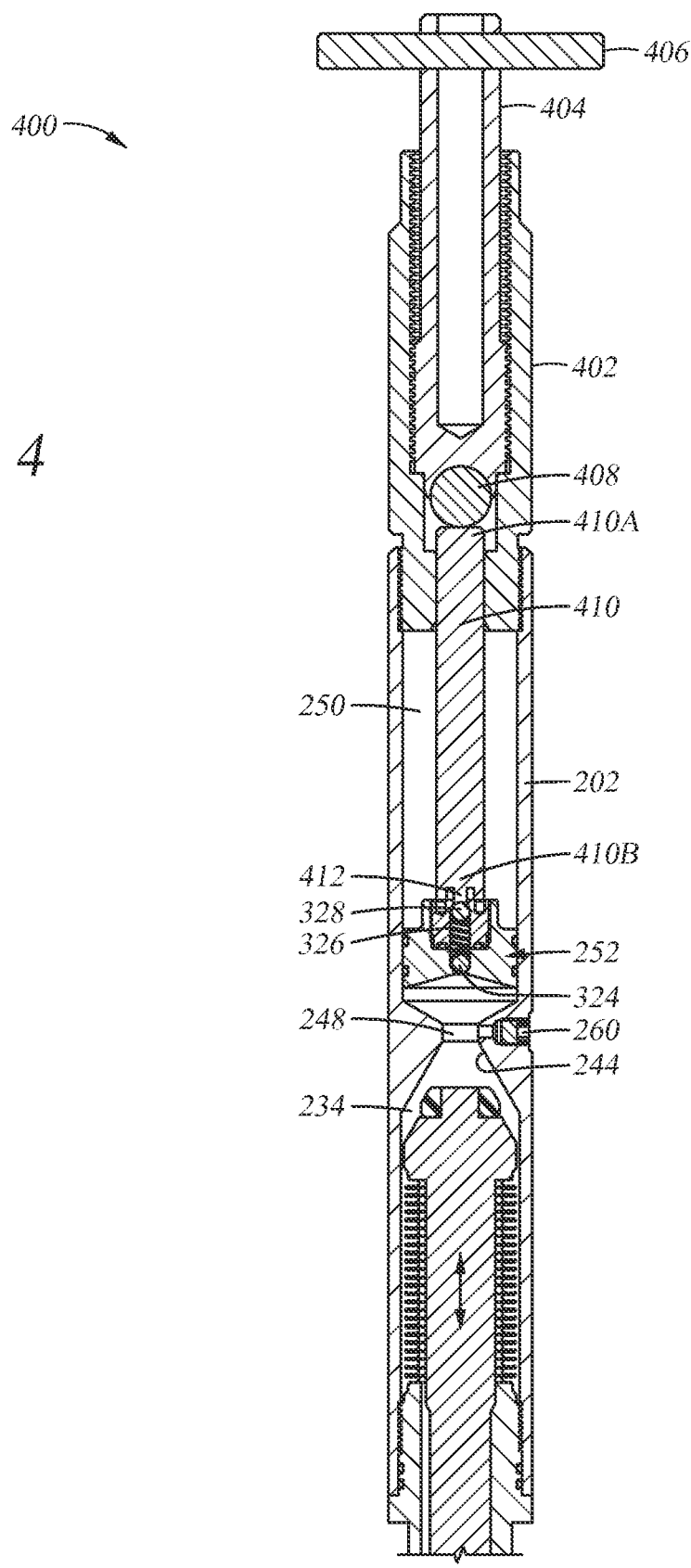
FIG. 4 is a schematic sectional view of a barrier installation tool according to one embodiment of the present disclosure.

Embodiments of the present disclosure further include an apparatus and methods for installing a barrier assembly in a gas lift valve. FIG. 4 is a schematic sectional view of a barrier installation tool 400 with the gas lift valve 200. The barrier installation tool 400 is configured to install a barrier assembly to a gas lift valve and to remove gas bubbles through the barrier assembly.

The barrier installation tool 400 may include a housing 402 having threads formed in the inner diameter and a threaded rod 404 movably disposed in the housing 402. A cross bar 406 may be attached to the threaded rod 404 to provide convenience in rotating the threaded rod 404. The housing 402 may be affixed to a housing of a gas lift valve, such as the housing component 202 of the gas lift valve 200. The barrier installation tool 400 further includes a push rod 410 partially disposed in the housing 402. The push rod 410 may be connected to the threaded rod 404 through a ball 408. A proximal end 410a of the push rod 410 contacts the ball 408. A distal end 410b of the push rod 410 is shaped to apply a force to the barrier assembly 252. The distal end 410b may include a tip 412 configured to push the ball 328 form its seat.

Prior to installing the barrier assembly 252, a liquid may be filled in the pressure charge chamber 240 outside the bellows 232 so that an exterior of the bellows 232 is surrounded by the liquid. The liquid may be filled in excess of up to half height of the volume above the orifice 248. In one embodiment, the liquid may be silicone oil. The liquid may be filled by pouring through the upper opening of the housing component 202 or through the charge valve 260.

The barrier assembly 252 may be inserted to the pressure charge chamber 240 above the liquid from the upper opening of the housing component 202. The barrier installation tool 400 is then attached to the housing component 202. The threaded rod 404 is rotated down so that the ball 408 is pushed against the proximal end 410a of the push rod 410 and the distal end 410b of the push rod 410 pushes against the barrier assembly 252. The tip 412 pushes the ball 328 away from the second sealing face 320 opening up the upper end of the two way check valve 258. The barrier assembly 252 may be pushed down the housing component 202 by rotation of the threaded rod 404. Because the barrier assembly 252 and the housing component 202 form an air tight seal, the atmosphere under the barrier assembly 252 may be compressed as the barrier assembly 252 moves downwards. As the atmosphere is further compressed, the air pressure under the barrier assembly 252 increases to open up the lower end of the two way check valve 258 allowing air to escape through the two way check valve 258. Any excess liquid may be removed from under the barrier assembly 252 by the same manner.

In one embodiment, the barrier installation tool 400 may be used to remove any dissolved air bubbles from the filled liquid. For example, the bellows 232 may expanded and compressed by moving the sliding stem 228 up and down. The expansion and compression of the bellows 232 may cause any gas bubbles to move up along the cone shaped shoulder 244, through the orifice 248, moves up again along the cone shaped surface of the first end 308 of the barrier assembly 252, and then escapes through the two way check valve 258. The cone shaped shoulder 244 facilitates moving up any gas bubbles from the liquid volume 234. Similarly, the cone shaped surface of the first end 308 also facilitates removal of gas bubbles.

Figure 5A:
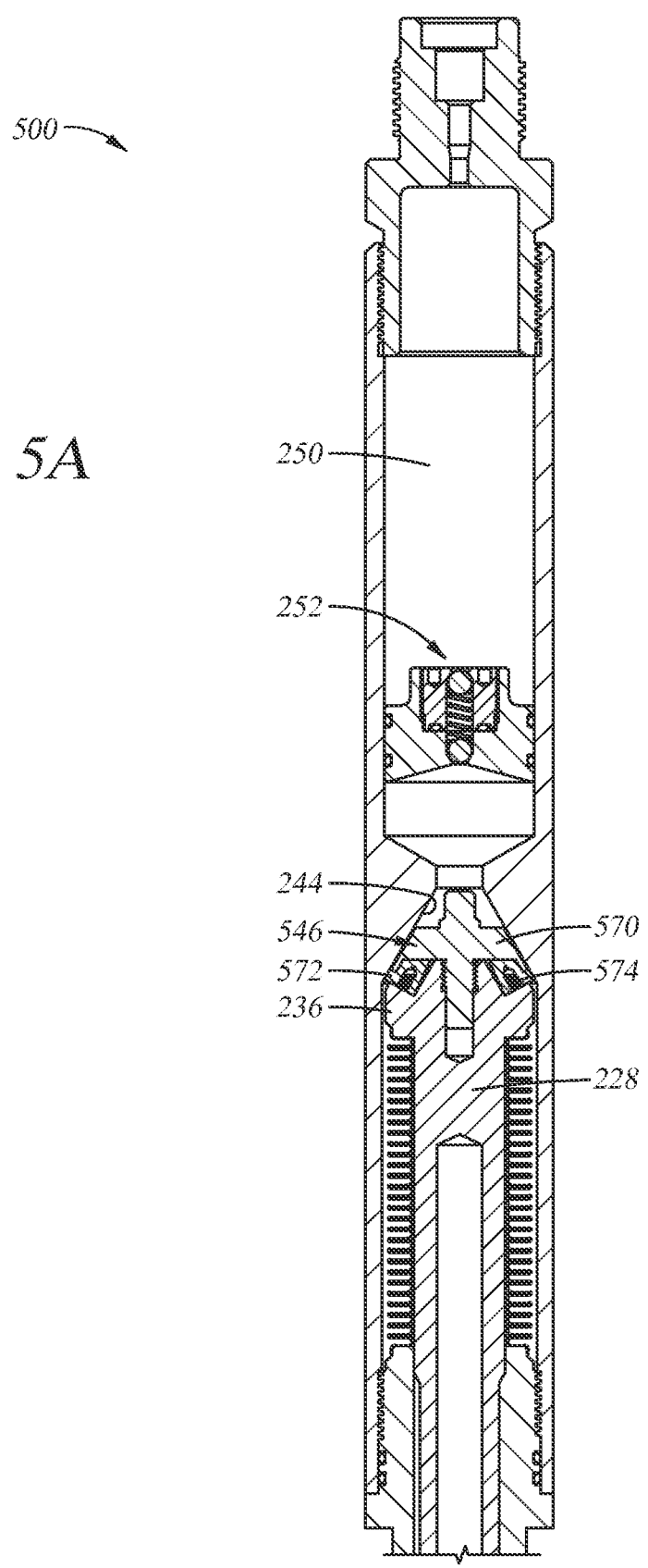
FIG. 5A is a schematic partial sectional view of a gas lift valve according to another embodiment of the present disclosure.
Figure 5B:
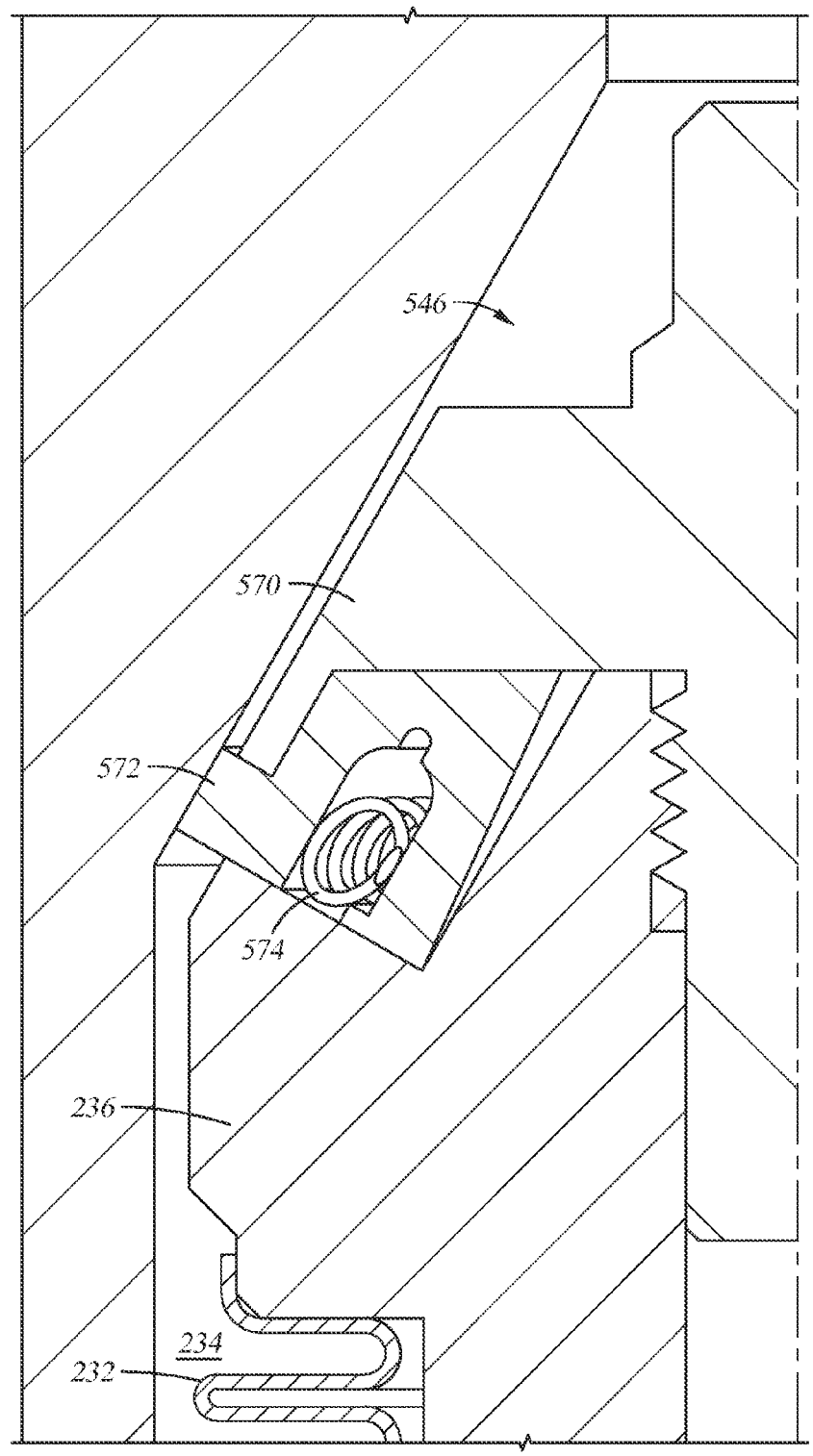
FIG. 5B is a partial enlarged sectional view of the gas lift valve of FIG. 5A showing a spring energized seal.

FIG. 5A is a schematic partial sectional view of a gas lift valve 500 according to another embodiment of the present disclosure. The gas lift valve 500 is similar to the gas lift valve 200 except that the gas lift valve 500 has a spring energized seal 546 in place of the seal member 246 of the gas lift valve 200. FIG. 5B is a partial enlarged sectional view of the gas lift valve 500 showing details of the spring energized seal 546. The spring energized seal 546 may include a seal element 572 and a spring element 574 biasing the seal element 572 against the cone shaped shoulder 244. In one embodiment, the spring element 574 may be a circumferential spring. A seal support member 570 may be attached to the head portion 236 of the sliding stem 228 to secure the seal element 572. The spring energized seal 546 can withstand higher operation pressure compared to the traditional seals.

Figure 6A:
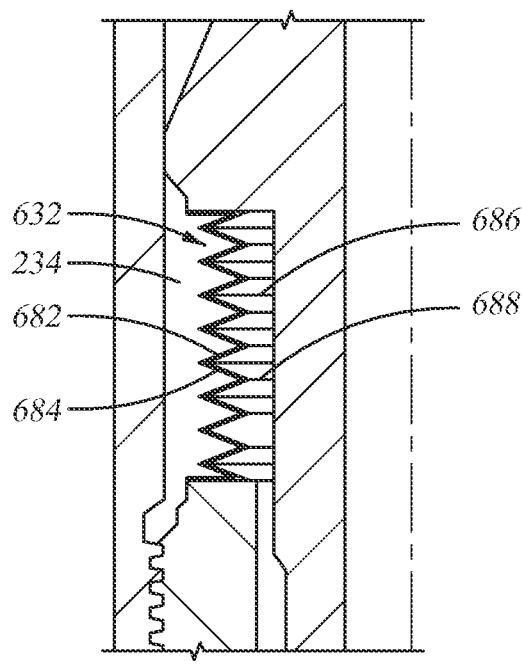
FIG. 6A is a schematic sectional view of a gas lift valve with an edge-welded bellows according to one embodiment of the present disclosure.

FIG. 6A is a schematic sectional view of a gas lift valve 600 according to one embodiment of the present disclosure. The gas lift valve 600 is similar to the gas lift valve 200 except that the gas lift valve 600 includes an edge bellows 632 and a sliding-captive seal mechanism 620 while the gas lift valve 200 includes a standard convoluted-formed bellows 232 and the ball and seat valve mechanism 220. The edge welded bellows 632 allows the gas lift valve 600 to operate at higher injection pressure.

Figure 6B:
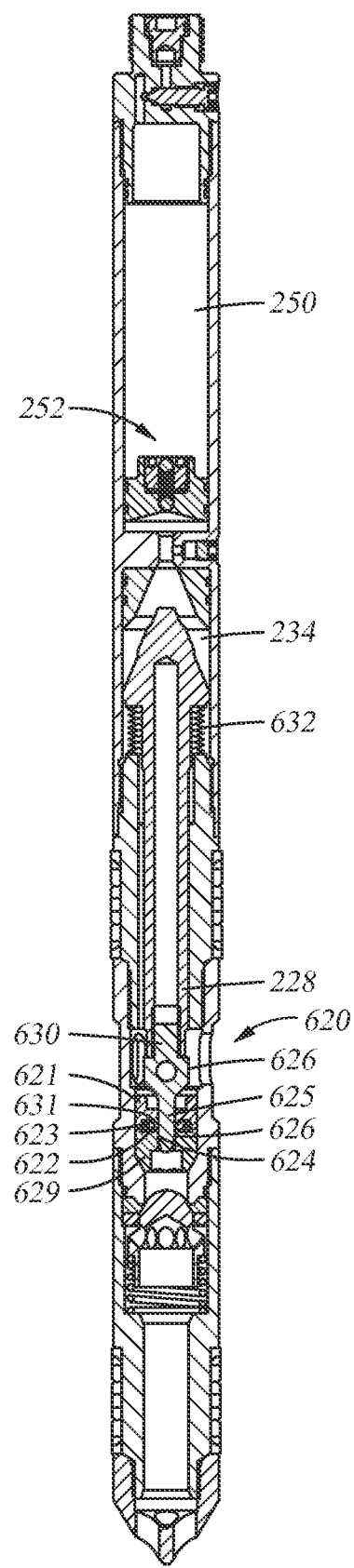
FIG. 6B is schematically illustrates an edge welded bellows.

FIG. 6B is schematic view of the edge welded bellows 632. The edge welded bellows 632 includes a plurality of diaphragms 682, 684 welded together. The diaphragms 682, 684 may be made from metal sheeting using hydraulic stamping techniques. The stamped diaphragms 682, 684 may be stacked back-to-back (male to female) and are welded together at inner diameters 688 and outer diameters 686. The diaphragms 682, 684 may be welded by plasma, laser, arc, or electron beam welding. The thickness, shape, and material of the diaphragms 682, 684 may be selected to suite operating pressure, stroke length, spring rate, temperature and other factors of the edge-welded bellows 632. The edge-welded bellows 632 may be fully compressed to a solid stack of diaphragms. The fully compressed state of the edge-welded bellows 632 can be used as a mechanical stop for a lower limit of the range of the motion with increased operating pressure. The sliding-captive seal mechanism 620, which does not require a mechanical stop to form a seal allows the fully compressed state of the edge-welded bellows 632 as a mechanical stop for the gas lift valve 600.

Referring to FIG. 6A, an upper end 632U of the edge welded bellows 632 may be affixed to the head portion 236 of the sliding stem 228. A lower end 632L of the edge welded bellows 632 may be affixed to the housing component 204. The edge welded bellows 632 may expand and compress depending on the pressure of injection gas from the gas injection port 210. The edge welded bellows 632 moves the sliding stem 228 to open or close the sliding-captive seal mechanism 620.

Figure 6C:
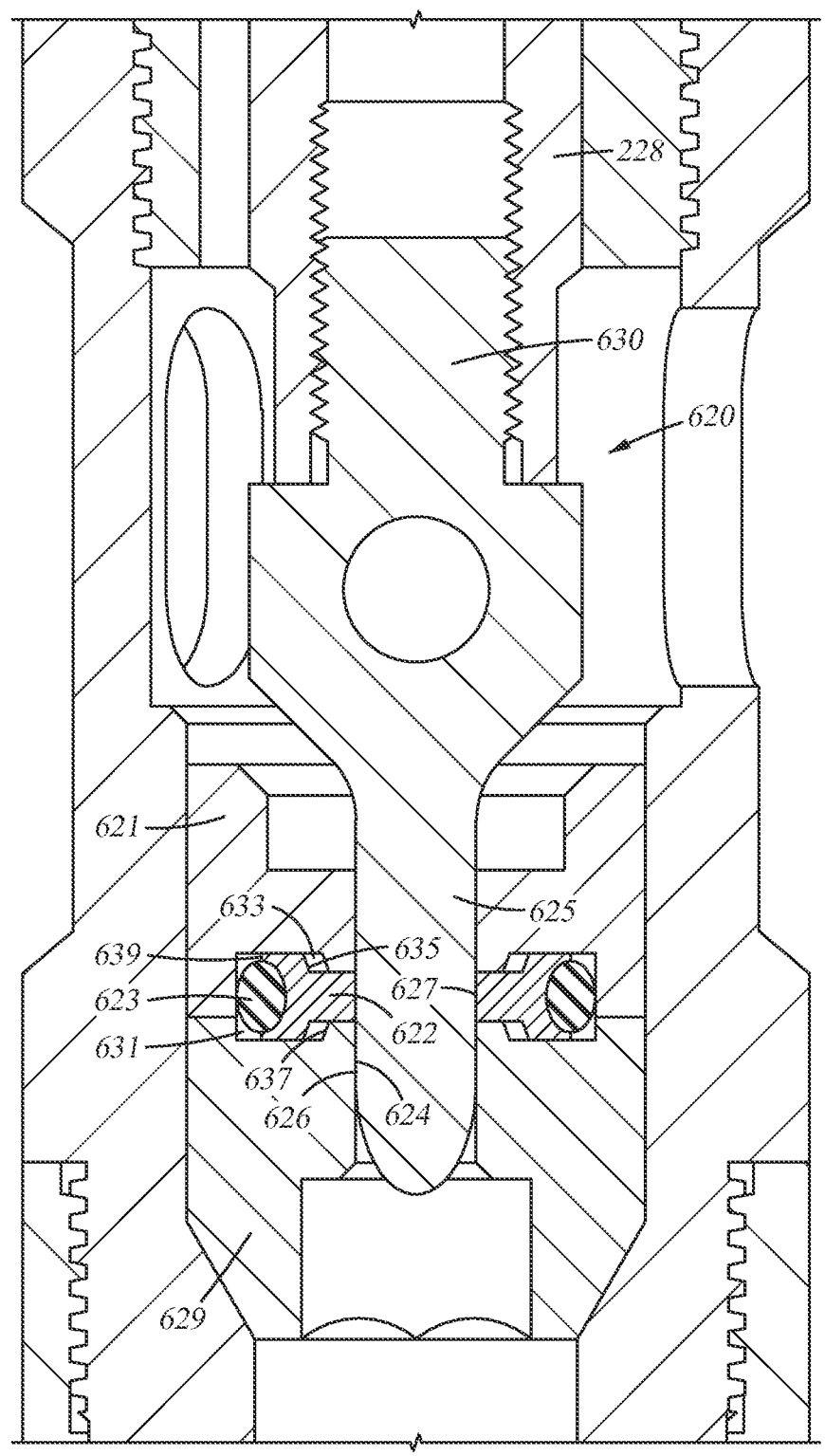
FIG. 6C is a partial enlarged sectional view of the gas lift valve of FIG. 6A showing a sliding-captive seal assembly.

FIG. 6C is a partial enlarged section view of the gas lift valve 600 showing the sliding-captive seal mechanism 620. The sliding-captive seal mechanism 620 includes a valve piston 630 attached to the distal end of the sliding stem 228. The valve piston 630 moves vertically with the sliding stem 228. The sliding-captive seal mechanism 620 further includes a cap element 621 and a base element 629 secured to the housing 201. In one embodiment, the cap element 621 and the base element 629 may be secured to the housing 201 by threads. The cap element 621 and the base element 629 form an orifice 624. Alternatively, the orifice 624 may be an integral part of the housing 201.

A sealing element 622 may be disposed in a groove 631 in the orifice 624. The sealing element 622 may be a ring. The section of the sealing element 622 may be thicker at an outer diameter 639 and thinner at an inner diameter 627. In one embodiment, the sealing element 622 may include a shoulder 635 between the inner diameter 627 and the outer diameter 639. The inner diameter 627 of the sealing element 622 forms a sealing surface. The sealing element 622 may be formed from a polymer, such as polytetrafluoroethylene (PTFE), TEFLON®, or the like.

The groove 631 may also include a shoulder 637 to hold the shoulder 635 of the sealing element 622. The shoulders 635, 637 prevent the sealing element 622 from being sucked out of the groove 631 while fluid flows through the orifice 624 at high flow rates. In one embodiment, a gap 633 may exist between the shoulders 635, 637. In one embodiment, the sealing element 622 may further include a biasing element 623 disposed in the groove 631 outside the sealing element 622. The biasing element 623 may a ring formed of an elastomer. The biasing element 623 is positioned to push the sealing element 622 towards the orifice 624. A distal end 625 of the valve piston 630 has an outer surface 626. The outer surface 626 may have a tight clearance to the inner diameter 627 of the sealing element 622.

During operation, the distal end 625 moves in and out of the orifice 624 as a result of the movement of the edge-welded bellows 632. When the distal end 625 inserts into the orifice 624, the inner diameter 627 of the sealing element 622 contacts the outer surface 626 of the distal end 625 to form a seal. The biasing element 623 applies a bias force to the sealing element 622 towards the distal end 625 enhancing the seal. Injection gas may enter the groove 631 and the pressure of the injection gas in the groove 631 may apply also a bias force to the sealing element 622 towards the distal end 625. When the inner diameter 627 of the sealing element 622 becomes worn out, the gap 633 allows the sealing element 622 to be pushed out of the groove 631 to the distal end 625 therefore extends the operation life of the sealing element 622.

As the gas lift valve 600 operates, the distal end 625 of the valve piston 630 can travel through the sealing element 622 to open and closed the flow path between the gas injection port 210 and the outlet port 212. When the distal end 625 inserts into the sealing element 622, the inner diameter of the sealing element 622 engages the outer surface 626 of the distal end 625 forming a sliding-captive seal.

Similar to the gas lift valve 200, the gas lift valve 600 also includes a barrier assembly 252 to separate the pressurized gas and the non-compressible liquid and the cone shaped shoulder 244 to facilitate gas bubble gathering. Therefore, the gas lift valve 600 has all the same advantages as the gas lift valve 600. Additionally, the edge-welded bellows 632 allows the gas lift valve 600 to operate at a higher injection pressure. In one embodiment, the gas lift valve 600 may operate at an injection pressure in excess of 5000 PSI and up to about 6000 PSI. It should be noted that the pressure range of the lift valves of the present disclosure are dependent on the bellows used. Bellows designed to operate under higher pressure allow higher pressure range of the gas lift valves.

During operation, the edge-welded bellows 632 moves the valve piston 630 depending on the pressure difference between in the liquid volume 234 and injection gas. The pressure in the liquid volume 234 acts on outside surfaces of the edge-welded bellows 632 while pressure of the injection gas acts on inner surfaces of the edge-welded bellows 632. When there is no injection pressure, the gas lift valve 600 is in the closed position as shown in FIG. 6A. At the closed position, the edge-welded bellows 632 may be compressed completely to its solid height. The full compression state protects the edge-welded bellows 632 from deformation caused by the external pressure in the liquid volume 234 because the edge-welded bellows 632 is compressed to its solid stack height, there is no room for the bellow's convolutions to deform and fail. The sliding-capture seal 620 does not need a fixed longitudinal position to maintain a seal therefore is compatible with the edge-welded bellows 632.

When injection gas enters the gas injection port 210 during operation, the injection gas travels internally the gas lift valve 600 in the space between the housing component 204 and the sliding stem 228 and enters the interior of the edge-welded bellows 632. The injection gas acts against the internal surfaces of the edge-welded bellows 632, pushing the convolutions against the external pressure in the liquid volume 234. Meanwhile, pressurized gas above the barrier assembly 252 and any oil or the like in the liquid volume 234 provides a counteracting force on the outer surfaces of the edge-welded bellows 632.

As pressure of the injection gas increases, the edge-welded bellows 632 will start to expand, and the valve piston 630 moves toward an open position. At some point, when the force of injection gas inside the edge-welded bellows 632 is large enough, the edge-welded bellows 632 expands to an upper limit when the head portion 236 of the sliding stem 228 contacts the cone shaped shoulder 244. The cone shaped shoulder 244 stops any further expansion of the edge-welded bellows 632 and movement of the liquid in the liquid volume 234.

If pressure of the injection gas decrease when the gas lift valve 600 is at an open position, the edge-welded bellows 632 may start to compress, and the valve piston 630 moves toward the closed position. At some point, when pressure of the injection gas is low enough or no injection gas enters the inner volume of the edge-welded bellows 632, the edge-welded bellows 632 reaches to the fully compressed state.

Figure 7:
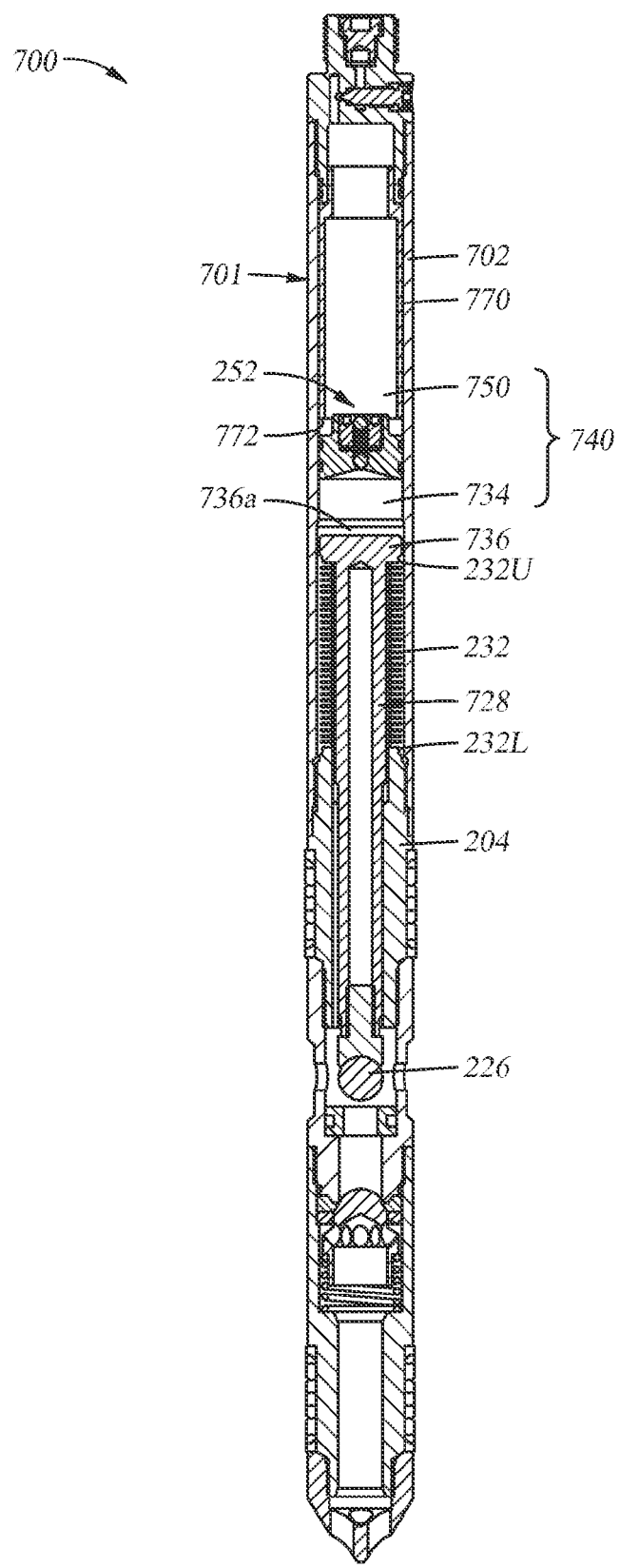
FIG. 7 is a schematic sectional view of a gas lift valve according to another embodiment of the present disclosure.

FIG. 7 is a schematic sectional view of a gas lift valve 700 according to another embodiment of the present disclosure. The gas lift valve 700 is similar to the gas lift valve 200 except that the gas lift valve 700 includes a stopper 770 disposed above the barrier assembly 252 to control an upper limit of the bellows 232. The gas lift valve 700 does not have any seals in a liquid volume 734 outside the bellows 232.

The gas lift valve 700 includes a housing 701 having one or more housing components. The housing 701 may define a pressure charge chamber 740. In one embodiment, the pressure charge chamber 740 may be a continuous cylindrical volume defined by a housing component 702. Alternatively, the pressure charge chamber 740 may have other shapes and may be defined by two or more housing components. Unlike the gas lift valve 200, the gas lift valve 700 does not have a shoulder over the bellows 232 to stop the bellows 232 from expanding over an upper limit. The stopper 770 acts as a stop to prevent bellows 232 from expansion over the upper limit.

The bellows 232 may be disposed in a lower portion of the pressure charge chamber 740. The barrier assembly 252 is disposed above the bellows 232. The barrier assembly 252 divides the pressure charge chamber 740 into a gas volume 750 and the liquid volume 734. The liquid volume 734 may be filled with non-compressible liquid. The gas volume 750 may be filled with pressurized gas. The gas lift valve 700 may include a sliding stem 728 having a head portion 736 connected to the upper end 232U of the bellows 232. The head portion 736 may have a planar top surface 736a.

The stopper 770 is disposed in the gas volume 750. The stopper 770 is configured to stop the barrier assembly 252 from moving pass an upper limit. In one embodiment, the stopper 770 may be a tubular section disposed against an inner diameter of the housing component 702. The stopper 770 may form a shoulder 772 in the gas volume 750. Alternatively, the stopper 770 may be any suitable structure that can stop the barrier assembly 252 at a predetermined location.

The liquid volume 734 is filled with a non-compressible liquid. The non-compressive liquid transfer motions between the barrier assembly 252 and the bellows 232. During operation, the expansion of the bellows 232 pushes up the head portion 736, the non-compressible liquid transfers the upward motion of the head portion 736 to the barrier assembly 252. The barrier assembly 252 then moves up and compresses the pressurized gas in the gas volume 750. When the barrier assembly 252 contacts the stopper 770, the barrier assembly 252 stops moving up which in turn stops the bellows 232 from moving up. Thus, the stopper 770 may be positioned to ensure that the bellows 232 moves within an upper limit.

Figure 8:
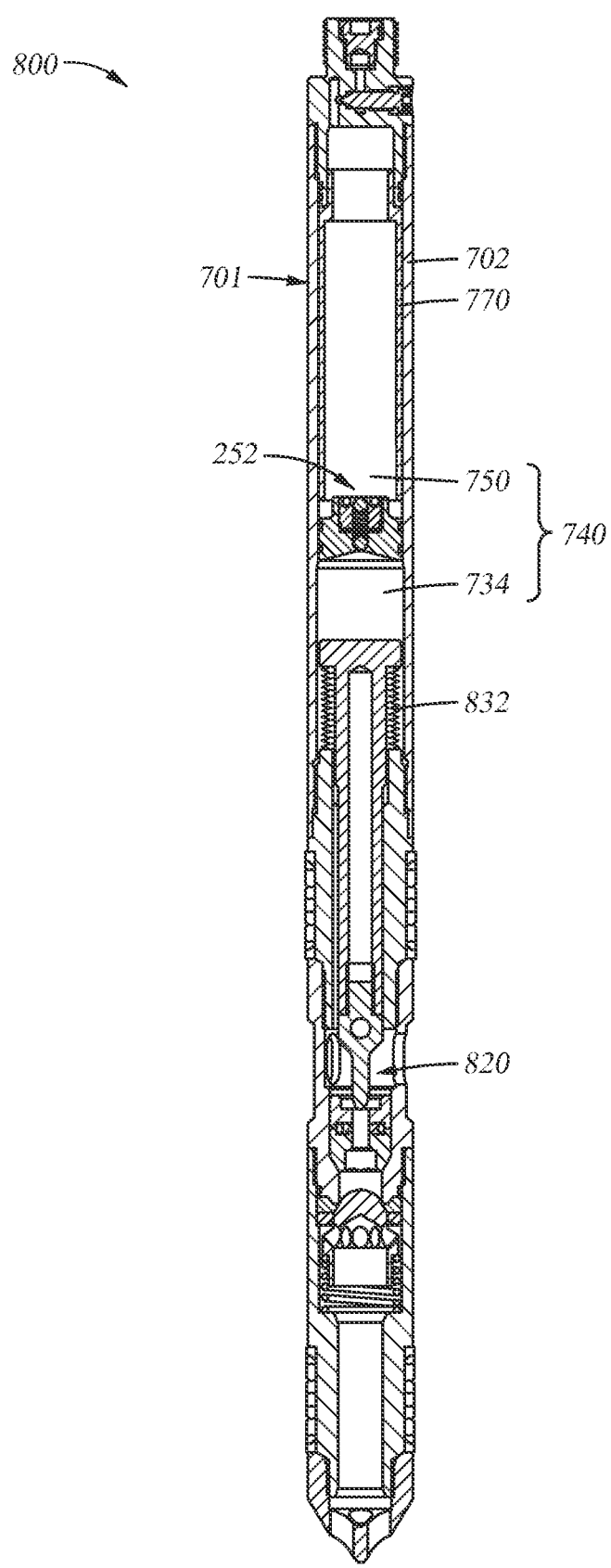
FIG. 8 is a schematic sectional view of a gas lift valve according to another embodiment of the present disclosure.

FIG. 8 is a schematic sectional view of a gas lift valve 800 according to another embodiment of the present disclosure. The gas lift valve 800 is similar to the gas lift valve 700 except that the gas lift valve 800 includes an edge-welded bellows 832 and a sliding-captive seal 820. The edge-welded bellows 832 is similar to the edge-welded bellows 632 of FIG. 6A. The sliding-captive seal 820 may be similar to the sliding-captive seal mechanism 620 of FIG. 6A. The stopper 770 provides an upper limit to the edge-welded bellows 832. A lower limit of the edge-welded bellows 832 is reached when the edge-welded bellows 832 is completed compressed.

Embodiments of present disclosure include a method for performing downhole gas lift operations. In one embodiment, the method includes disposing a gas lift valve in a side pocket mandrel of a production tubing, wherein the gas lift valve includes one or more components forming a housing, wherein the housing has a gas injection port and an outlet port, a valve mechanism disposed in the housing, wherein the valve mechanism selectively opens and closes a flow path between the gas injection port and the outlet port, a bellows coupled to the valve mechanism, wherein a first side of the bellows is in fluid communication with the gas injection port, and a second side of the bellows is in fluid communication with a pressure charge chamber formed in the housing, and a barrier assembly movably disposed in the pressure charge chamber, wherein the barrier assembly divides the pressure charge chamber to a liquid volume and a gas volume, the liquid volume is positioned between the gas volume and the second side of the bellows, the liquid volume is filled with a liquid and the gas volume is filled with a pressurized gas. The method further includes opening the gas lift valve by injecting a gas flow downhole.

In another embodiment, the method further includes closing the gas lift valve by discontinuing injection of the gas flow. In one embodiment, opening the gas lift valve includes injecting the gas flow through the gas injection port to the first side of the bellows, and increasing the pressure of the gas flow to extend the bellows, wherein the extension of the bellows moves a sealing member of the valve mechanism away from a sealing surface.

In another embodiment, the method further includes stopping the bellows at an upper limit. In one embodiment, stopping the bellows includes contacting a head portion of a sliding stem attached to the bellows with a cone shaped shoulder formed in the housing. In one embodiment, stopping the bellows includes stopping the barrier assembly.

One embodiment of the present disclosure is a tool for installing a barrier assembly. The tool comprises a housing attachable to the gas lift valve, wherein the housing has a threaded inner surface, a threaded rod coupled to the threaded inner surface of the housing, and a push rod having a proximal end facing the threaded rod and a distal end having a tip.

One embodiment of the present disclosure is a method for installing a barrier assembly. The method comprises partially filling a pressure charge chamber of a gas lift valve with a liquid, wherein the gas lift valve comprises a bellows, a first side of the bellows is in fluid communication with a gas injection port and a second side of the bellows faces the pressure charge chamber, pushing the barrier assembly into the pressure charge chamber towards the liquid, and pushing open a one way of the barrier assembly to allow any gas below the barrier assembly to escape through the barrier assembly.

One embodiment of the present disclosure provides a valve. The valve includes a housing, a bellows disposed in the housing, wherein a first side of the bellows is in fluid communication with an inlet of the housing, and a second side of the bellows faces a closed chamber in the housing, and a barrier assembly disposed in the closed chamber.

Embodiments of the present disclosure are described above with gas lift valves with injection gas pressure acting against internal surfaces of a bellows while external surfaces of the bellows are supported by non-compressible oils. Embodiments of the present disclosure may also apply to gas lift valves with injection gas pressure acting against external surfaces of a bellows while internal surfaces of the bellows are supported by non-compressible oils.

While the foregoing is directed to embodiments of the present disclosure, other and further embodiments may be devised without departing from the basic scope thereof, and the scope thereof is determined by the claims that follow.

The invention claimed is:

1. A valve for controlling fluid flow, comprising:
a housing having a gas injection port and an outlet port;
a valve mechanism configured to selectively open and close a flow path between the gas injection port and the outlet port;
a bellows coupled to the valve mechanism, wherein a first side of the bellows is in fluid communication with the gas injection port, and a second side of the bellows is in fluid communication with a pressure charge chamber formed in the housing; and
a barrier assembly movably disposed in the pressure charge chamber, wherein the barrier assembly divides the pressure charge chamber into a liquid volume and a gas volume, and the liquid volume is positioned between the barrier assembly and the second side of the bellows, wherein:
the barrier assembly comprises a piston movable along an inner surface of the housing; and
the piston comprises:
a cylindrical body, wherein a flow path is formed through the cylindrical body, a first end of the flow path faces the liquid volume, and a second end of the flow path faces the gas volume; and
a two way check valve disposed in the flow path.

2. The valve of claim 1, wherein the two way check valve comprises:
a first ball disposed at the first end of the flow path;
a second ball disposed at the second end of the flow path; and
a bias member disposed between the first ball and the second ball.

3. The valve of claim 2, wherein the bias member is a spring.

4. The valve of claim 1, wherein the barrier assembly further comprises one or more seal rings disposed on an outer diameter of the piston.

5. The valve of claim 1, wherein the housing comprises a cone shaped shoulder in the liquid volume, and the cone shaped shoulder stops the bellows from moving beyond an upper limit.

6. The valve of claim 1, further comprising a stopper disposed in the gas volume, wherein the stopper is positioned to stop the barrier assembly from moving beyond an upper limit.

7. The valve of claim 1, wherein the valve mechanism comprises a ball and seat valve.

8. The valve of claim 1, wherein the valve mechanism comprises a sliding-captive seal.

9. A method of operating a gas lift valve, comprising:
supplying a gas into the gas lift valve, the gas lift valve comprising the valve of claim 1;
expanding the bellows of the gas lift valve against a non-compressible fluid;
moving the barrier assembly disposed between a non-compressible liquid and the gas volume to reduce a size of the gas volume; and
opening the outlet port to eject the gas in the gas lift valve.

10. The method of claim 9, further comprising expanding the size of the gas volume by decreasing pressure of the gas supplied.

11. The method of claim 9, wherein expanding the bellows against the non-compressible fluid displaces the non-compressible fluid.

12. The method of claim 11, wherein displacing the non-compressible fluid moves the barrier assembly.

13. The method of claim 12, wherein reducing the size of the gas volume increases the pressure in the gas volume.

14. The method of claim 13, further comprising expanding the size of the gas volume by decreasing pressure of the gas supplied.

15. The method of claim 14, further comprising:
retracting the bellows in response to expanding the size of the gas volume; and
closing the outlet port.

* * * * *